(12) United States Patent
Winegard

(10) Patent No.: US 8,103,169 B2
(45) Date of Patent: Jan. 24, 2012

(54) VWS SECURE/NON-SECURE BYPASS SWITCH

(75) Inventor: Robert Winegard, Laurel, MD (US)

(73) Assignee: Criticom Critical Communications, Lanham, MD (US)

( * ) Notice: Subject to any disclaimer, the term of this patent is extended or adjusted under 35 U.S.C. 154(b) by 0 days.

(21) Appl. No.: 12/369,540

(22) Filed: Feb. 11, 2009

(65) Prior Publication Data

US 2009/0147069 A1 Jun. 11, 2009

Related U.S. Application Data

(63) Continuation of application No. 10/733,125, filed on Dec. 11, 2003, now Pat. No. 7,519,298.

(60) Provisional application No. 60/432,478, filed on Dec. 11, 2002.

(51) Int. Cl.
*H04B 10/12* (2006.01)
*H04N 7/14* (2006.01)
*H04N 7/16* (2006.01)

(52) U.S. Cl. ............... 398/141; 398/115; 348/14.08; 725/26

(58) Field of Classification Search ............ 398/45, 398/55, 115, 141; 307/132 E; 340/644; 348/14.08; 375/352; 385/22; 725/26
See application file for complete search history.

(56) References Cited

U.S. PATENT DOCUMENTS

| 4,903,298 | A | * | 2/1990 | Cline | 380/270 |
|---|---|---|---|---|---|
| 5,666,402 | A | | 9/1997 | Griffin | |
| 6,202,153 | B1 | * | 3/2001 | Diamant et al. | 726/35 |
| 6,578,089 | B1 | * | 6/2003 | Simpson et al. | 709/249 |
| 6,643,783 | B2 | * | 11/2003 | Flyntz | 726/9 |
| 6,763,226 | B1 | | 7/2004 | McZeal, Jr. | |
| 7,519,298 | B2 | * | 4/2009 | Winegard | 398/141 |
| 7,539,421 | B2 | * | 5/2009 | Winegard | 398/141 |
| 2005/0025302 | A1 | | 2/2005 | Schmid et al. | |

OTHER PUBLICATIONS

Cycomm-1000 Series Voice Scrambler brochure, CYCOMM, Inc. 1988.*
Cycomm-1000 Series Voice Scrambler brochure, CYCOMM, Inc., 1988.

* cited by examiner

*Primary Examiner* — Nathan Curs
(74) *Attorney, Agent, or Firm* — The Farrell Law Firm, P.C.

(57) ABSTRACT

Disclosed is a secure/non-secure bypass switch, which includes a secure mode signal path, and a non-secure mode signal path, wherein signals are routed through an encryption device connected in the secure mode signal path when no power is supplied to the switch, and the signals are routed through the non-secure path when power is supplied to the switch.

2 Claims, 2 Drawing Sheets

VWS SECURE/NON-SECURE BYPASS SWITCH

PRIORITY

This application is a continuation of U.S. application Ser. No. 10/733,125, filed Dec. 11, 2003 now U.S. Pat. No. 7,519,298, which claims the benefit of U.S. Provisional Application No. 60/432,478 filed on Dec. 11, 2002, entitled "VWS SECURE/NON-SECURE BYPASS SWITCH", the contents of each of which are incorporated herein by reference.

TECHNICAL FIELD

The present invention relates generally to security systems and more particularly to a bypass switch for secure and non-secure video conferencing.

BACKGROUND

Teleconferencing systems allow virtual meetings among two or more remotely located participants to take place using the existing telephone or data network connections. A simple teleconference may involve audio conferencing in which the participants share a speakerphone over a conventional telephone connection. In addition to the audio capabilities, a more sophisticated teleconference may involve videoconferencing in which participants can see images of one another during the conference.

Videoconferencing typically utilizes non-secure data lines for routing communications data among the participants. Accordingly, if users need to communicate sensitive or classified data, special arrangements have to be made before the videoconferencing can take place. For example, in the United States (U.S.), the U.S. Department of Defense's Communication Security (COMSEC) and Electro-Magnetic Security (EMSEC) guidance and policy requirements for providing secure and non-secure applications call for secure videoconferencing when communicating highly sensitive national security data.

Secure conferencing system installations, however, are traditionally labor intensive and require a site-survey and design by specialized secure integration engineers. In addition, the installations are usually designed with little consideration for ease of use. Frequently, a full time on-site technician is needed to complete the numerous "patches" and rerouting to transition between secure and non-secure connections. Thus, there is a need for a videoconferencing system (VTC) that enables users to perform videoconferencing in a secure and non-secure environment while maintaining features such as on screen dialing for ease of use.

SUMMARY

To solve the foregoing problems, provided is a secure/non-secure bypass switch, which includes a secure mode signal path, and a non-secure mode signal path, wherein signals are routed through an encryption device connected in the secure mode signal path when no power is supplied to the switch, and the signals are routed through the non-secure path when power is supplied to the switch.

Also provided is a secure/non-secure signal bypass method in a secure/non-secure bypass switch having a secure path and a non-secure path, including when no power is supplied to the secure/non-secure bypass switch, routing signals through the secure path, and when power is supplied to the secure/non-secure bypass switch, routing signals through the non-secure path.

comprising the steps of receiving signals to be routed; determining if a secure or a non-secure operating mode is selected; if a non-secure mode is selected, configuring relays to route the signals through two fiber optic modems to an output port; and if a secure mode is selected, configuring relays to route the signals through an encryption device to said output port.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
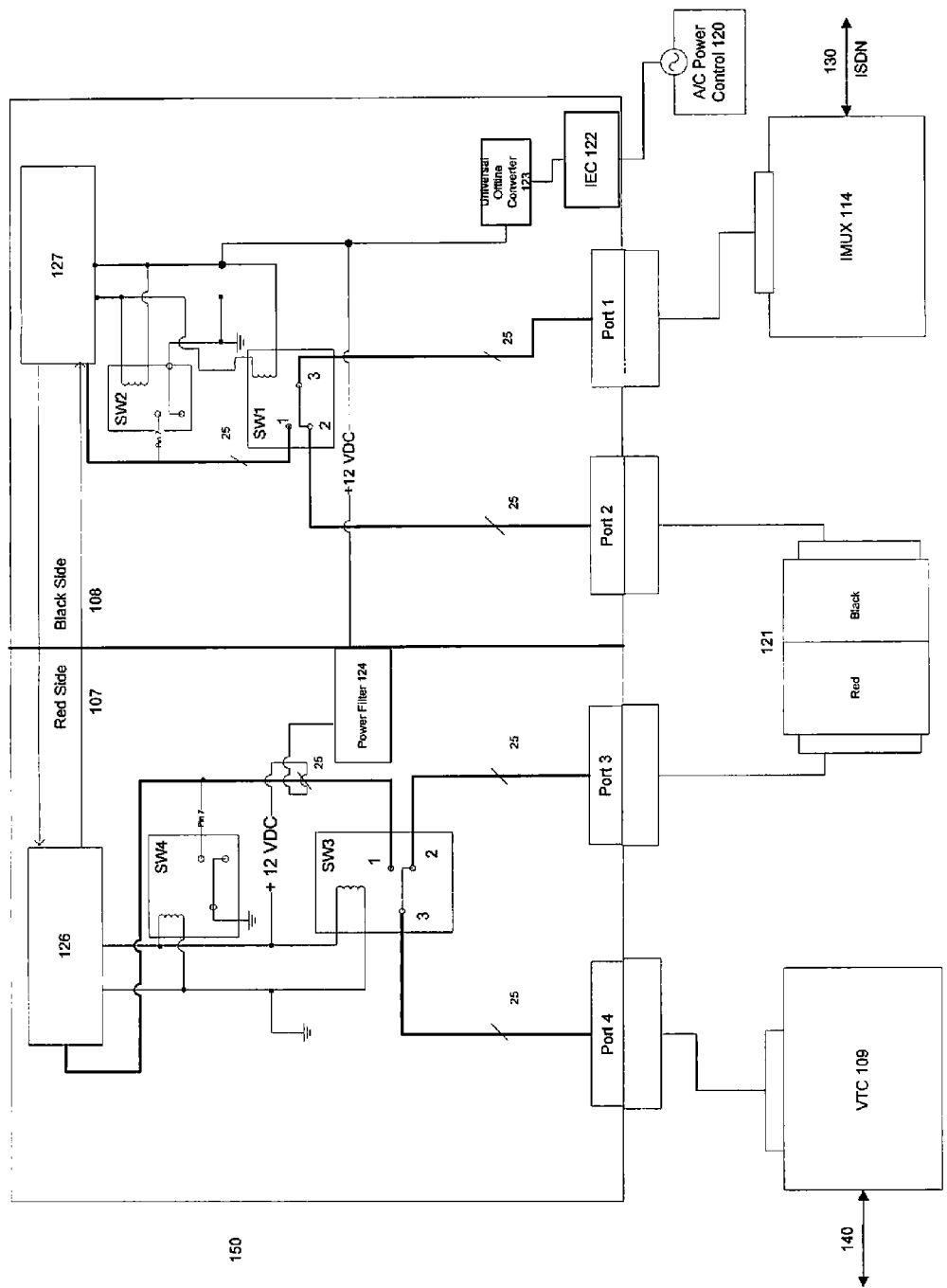
FIG. 1 is a diagram illustrating the secure/non-secure bypass switch according to an embodiment of the present invention.

Preferred embodiments of the present invention will be described in detail with reference to the drawings. In the following description of the present invention, a detailed description of known functions and configurations incorporated herein will be omitted when it may obscure the subject matter of the present invention.

Supporting secure and non-secure videoconferencing within the same system requires compliance with COMSEC/EMSEC criteria. Essentially, the criteria require red/black signal separation and isolation as well as Tempest emanation management. The secure and non-secure operations are achieved by engineering systems so that non-encrypted sensitive classified data is not transmitted, intentionally or unintentionally, outside of the Tempest zone, which could lead to the potential interception by adversarial third parties.

The present invention employs fiber optic coupling, waveguide technologies and the VWS switching design according to the present invention to provide failsafe certified separation and isolation. An incorporated mode indicator, for example a lighting system or other visual display, and toggle switch can be provided for additional visual confirmation of status and further eliminates any opportunity for user error. Unlike systems built upon untested and unconfirmable manual A/B switching, the present invention provides verifiable failsafe compliance.

To overcome the shortcomings of existing secure/non-secure switches, and to address security issues for users that desire to utilize their video conferencing system in a secure or non-secure mode, the present invention has been developed. The bypass switch design according to the present invention addresses secure/non-secure video communications with the desire to meet and exceed COMSEC/EMSEC or emanations security criteria.

The reliable and failsafe bypass switch is designed in a self-contained security console providing user-friendly, switch selectable, secure and non-secure H.320 communications. A typical system would integrate network termination equipment, IMUX, the VWS, encryption signal isolation, dial isolator, ISEC control module, KIV 7/KIV 19 mounting rack, and a special mounting rack to create a single, user-friendly system.

The VWS is a self-contained module allowing remote controlled switching between secure and non-secure paths while maintaining the highest degree of red/black separation. The VWS can be contained in a rack mountable metal EMI/RFI housing. The housing would be divided into two separate chambers by an internal metal bulkhead. Each chamber provides two chassis mounted DB-25 connectors on the rear. The red chamber connectors at the input/output ports are Codec and KIV-R. The black chamber is for the IMUX and KIV-B. Secure/non-secure mode selection is accomplished with presence/absence of A/C power to the VWS. Each chamber contains a set of 25 non-latching electro-mechanical relay contacts. The default (de-energized) relay state is the secure mode. During secure operation, the VWS is a completely passive connection with no active electronics. In fact, it has no power applied. The separate EMI/RFI chambers provide shielding between the red and black signals contained within each compartment.

FIG. 1 is a diagram illustrating the secure/non-secure bypass switch according to an embodiment of the present invention. The VWS 150 is connected to an inverse multiplexer (IMUX) 114. IMUX 114 may be implemented, for example, with the Adtran model ISU 512 inverse multiplexer BRI. The IMUX 114 receives/transmits ISDN signals, but other signal formats are contemplated. The format available determines which IMUX is selected.

The IMUX 114 converts the ISDN channels to high-speed data. The high-speed data is routed to port 1 of VWS black side 108, which in turn is connected to Contact 3 of SW1 of VWS black side switch 108. In a non-secure mode, Contact 1 of SW1 routes directly to Contact 1 of SW3 of VWS red side 107, through fiber optic modems 126 and 127. Contact 3 of SW3 is connected to port 4, which in turn is connected to a compliant network connection. Contact 2 of SW3 is connected to port 3, and Contact 2 of SW1 is connected to port 2.

The VTC system 109 typically includes a codec for data conversion, compression and decompression into video formats, for presenting the conference to the user at the user end.

The transition to secure mode may be performed with a single push-button or toggle switch (not shown). This causes each VWS switch to change both Contact 2's of SW1 and SW3 to connect to the Contact 3's of SW1 and SW3 respectively. This path incorporates the encryption device 121, either a KIV 7 or KIV 19, depending on a client application. KIV 7, for example, may be enclosed in a Pulse Engineering model 3014-2 housing for KIV 7, and connected using KIV 7 Red/Black cables. KIV 19 may be enclosed in the CritiCom/Pulse Engineering model 5020-CTRL housing for KIV 19 and connected using KIV 19 Red/Black cables.

In the preferred embodiment, a user simply flips a switch on a tabletop switch module 101 into the "SECURE" or "NON-SECURE" mode. This triggers the system control module to perform several functions. Among them are:

A. In NON-SECURE mode:
 1. Power up the system VWS sides 107 and 108, which in turn places the system into the non-secure mode, and
 2. Changes a security status indicator display 104 to "NON-SECURE" 104*b*

B. In SECURE mode:
 1. Powers down the system VWS sides 107 and 108 and places the system into the secure mode, and
 2. Changes the security status indicator display 104 to "SECURE" 104*a*.

At this point users can simply dial as they normally would if the system were not present. Any user can make secure or non-secure calls with no training.

Non-secure mode is selected by the application of A/C power to the VWS sides 107 and 108. The power supply for the VWS 150 is comprised of A/C power control 120, IEC 122, universal offline converter 123, and power filter 124. Other power-supply configurations are contemplated. The power supply applies current to the electro-mechanical relays SW1-SW4 (SW1-SW4 represent a bank of relays from 1 to 25, or more, depending on system design) and the fiber-optic modems 126 and 127.

If the system is operating in secure mode, the power to the fiber optic modems 126 and 127 is also terminated to prevent an unintended signal being conducted on the unencrypted path.

In addition, the VTC system 109 may include a connection for dialing information to be passed from the VTC system 109 to the IMUX 114. This path would be monitored during the secure operation to protect the sensitive information from being inductively coupled and carried to the outside world. An optic coupler in this path would convert the electronic voltages to a digitized light stream and then back again to electronic voltages. This "voltage to light" conversion breaks any potential conductive path and strips low voltage signals below the driver threshold.

In a non-secure mode, the VTC 109 is routed to the Contact 3 of SW3. Contact 3 of SW3 is connected to Contact 1 of SW3. Contact 1 of SW3 is connected to the matching port Contact 1 of SW1 of the IMUX side of the VWS switch 108 via the fiber optic modems 126 and 127 housed within the system. The fiber optic modems 126 and 127 are implemented. In one embodiment, power for the modems is only supplied in the non-secure mode. The power controller 120 in one embodiment may be implemented using a power control module. Fiber optic modem 127 is connected to Contact 1 of SW1 of VWS switch 108, which connects to Contact 3 of SW1. Contact 3 of SW1 is connected to port 1 to complete the non-secure path.

In a secure mode, the secure path shares the common cables of the Contact 3s of SW1 and SW3 to the VTC 109, IMUX 114, and VWS sides 107 and 108, respectively. When the secure mode is selected, both VWS sides are changed to Contact 2s of SW1 and SW3, completing the encrypted data path through KIV 121. In one aspect, isolation from the non-secure path has three layers of protection. All contacts, including chassis and signal grounds in the VWS sides 107 and 108 are switched. The physical separation of the relay contacts provides conductive and low voltage capacitive isolation. The second and third layers of protection are incorporated into the fiber isolated feature. When secure mode operation is selected, power to the fiber optic modems 126 and 127 in the non-secure path is terminated through use of SW2 and SW4. Even though the photon coupling of the optical connection alone provides a very high degree of isolation, the termination of modem power provides, in effect, a complete disconnect of the unencrypted path.

The encryption devices used may include KIV 7 or KIV 19 COMSEC devices. KIV 7 is designed as a terminal encryption device and supports RS-530 interface control leads. A standard KIV 7 front-loading 19-inch rack-mount housing is provided for KIV 7 applications. The system, when optioned for KIV 19, features a custom housing incorporating photon-coupled isolation of the required control signals. Other encryption devices are contemplated.

To prevent the unintentional disclosure of sensitive information during a non-secure conference in situations such as this, the system can include automated secure/non-secure status indicators. This provides a prominent visual reminder of the security level for the current conference.

Figure 2:
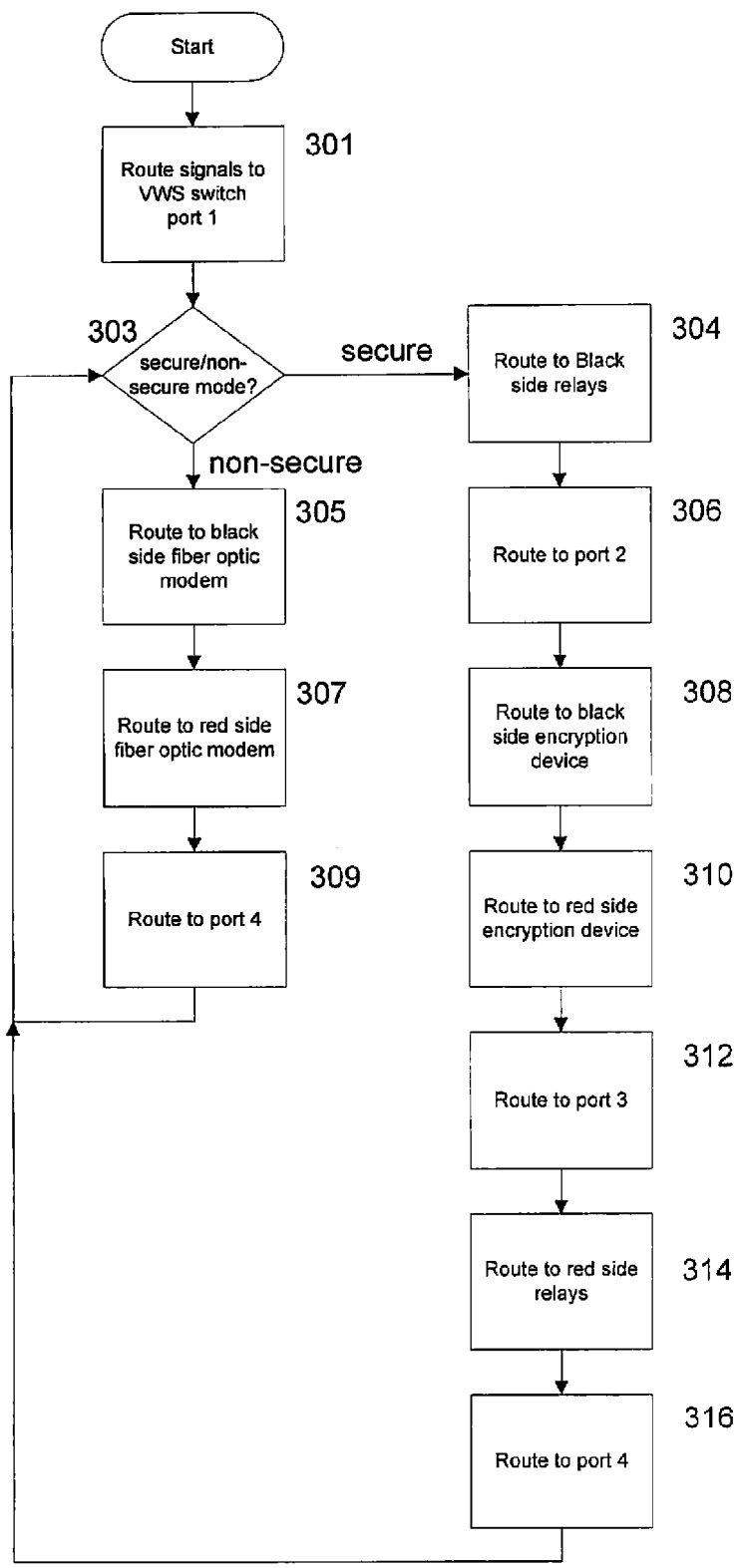
FIG. 2 is a flow diagram illustrating an operating method of the secure/non-secure bypass switch according to an embodiment of the present invention.

FIG. 2 is a flow diagram illustrating an operating method of the secure/non-secure bypass switch according to an embodiment of the present invention. At 301, the ISDN channels are routed through IMUX 114 to port 1. If it is determined at 303 that the current mode is in non-secure mode, at 305 the signals are sent to the fiber optic modem 127 through contacts 3 and 1 of SW1. At 307 the signals are sent to the fiber optic modem 126. Finally, in non-secure mode, the signals are routed through contacts 1 and 3 of SW3 to port 4.

At 306, if it is determined that the current mode is secure, the connection is switched to Contact 2s of SW1 and SW3 of the VWS sides, and routing is done via the encryption device 121. At 304, the signal input through port 1 and contact 3 of SW1, is routed to Contact 2 of SW1. At 306 the signal is routed to port 2. At 308 the signal is routed through the KIV 121, and to port 3 at 312. Next at 314 the signal is routed to Contact 2 of SW3 of VWS red side 107, and then routed through Contact 3 of SW3 to port 4.

As stated earlier, human error can unintentionally defeat the most robust COMSEC countermeasures. The physical appearances of the VTC system will be the same in either mode of operation and a participant in a secure VTC may logically assume that they can freely discuss classified information on subsequent conferences over the same system. To prevent the unintentional disclosure of sensitive information during a non-secure conference, the system according to the present invention provides an automated secure/non-secure status indicator display. This provides a prominent visual reminder of the security level for the current conference.

In summary, the VWS is a self contained module allowing remote controlled switching between secure and non-secure paths while maintaining the highest degree of Red/Black separation. The VWS is contained in an EIA 19" rack mountable 1 U metal EMI/RFI housing. The housing is divided into two separate chambers by an internal metal bulkhead. Each chamber features 2 chassis mounted DB-25-connectors on the rear. The red chamber connectors are Codec and KIV (red side) Plain Text. The black chamber is for the IMUX and KIV (black side) Cipher Text. Secure/non-secure mode selection is accomplished with presence/absence of A/C power to the VWS. Each chamber contains a set of 25 non-latching electro-mechanical relay contacts. The default (de-energized) relay state is the secure mode. During secure operation or "Power off", the VWS is a completely passive connection with no active electronics. In fact, the switch has no power applied. The separate EMI/RFI chambers provide shielding between the Red and Black signals contained within each compartment. In a Secure mode, the VWS relays connect by default the IMUX to the encryptor's black side and the Codec to the encryptor's RED side, thus creating a fail-safe path in the secure mode through the encryption device. This can be viewed as simply a cable connection since there are no powered components in the VWS during secure operation. In this mode, the VWS is a completely passive device that forces all data through an encryptor. Non-secure mode is selected by the application of A/C power to the VWS. A DC power supply in the black chamber applies current to the electro-mechanical relays and RS-530 fiber optic modem/photonic coupler. DC power is fed through a bulkhead filter energizing the switching relays and RS-530 fiber optic modem/photonic coupler of the red chamber as well. The relay's energized path routes the Codec and IMUX signals to and through the now active RS-530 fiber optic modem/photonic coupler or optical isolators. Although the power and signal filtering are not a concern during non-secure operation, they are required to maintain separation between the red and black chambers during secure operation. The filter and isolator's characteristics would provide acceptable separation in an active (powered) condition. However, the VWS design increases the isolation and separation level by terminating all power during secure operation. The VWS provides the convenience and ease of use of an electro-mechanically controlled switch while exceeding the electronic separation of manual red and black patch panels in separate EMI/RFI enclosures.

While the invention has been described with reference to several embodiments, it will be understood by those skilled in the art that the invention is not limited to the specific forms shown and described. Thus, various changes in form and details may be made therein without departing from the spirit and scope of the invention as defined by the appended claims.

What is claimed is:

1. A system having a secure/non-secure bypass switch, comprising:
    a secure mode signal path of the switch; and
    a non-secure mode signal path of the switch,
    wherein videoconferencing signals are routed from the switch to an external encryption device connected in the secure mode signal path before returning to the switch when no power is supplied to the switch, and the signals are routed internally through the non-secure path when power is supplied to the switch; and
    wherein a first side of the switch connected to an inverse multiplexer has no direct connection to a second side of the switch connected to a codec when no power is supplied to the switch.

2. A secure/non-secure videoconferencing signal bypass method in a system having a secure/non-secure bypass switch with a secure path and a non-secure path, comprising the steps of:
    when no power is supplied to the secure/non-secure bypass switch, routing videoconferencing signals from the secure/non-secure bypass switch to an external encryption device connected in the secure path before returning to the secure/non-secure bypass switch; and
    when power is supplied to the secure/non-secure bypass switch, routing videoconferencing signals internally through the non-secure path;
    wherein a first side of the switch connected to an inverse multiplexer has no direct connection to a second side of the switch connected to a codec when no power is supplied to the switch.

* * * * *